United States Patent
Shin et al.

(10) Patent No.: US 9,235,818 B2
(45) Date of Patent: Jan. 12, 2016

(54) ELECTRIC DEVICE, POWER MANAGEMENT APPARATUS AND METHOD FOR CONTROLLING THE SAME

(75) Inventors: Jong Hyun Shin, Suwon-si (KR); Jae Hwi Jang, Yongin-si (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 670 days.

(21) Appl. No.: 13/349,677

(22) Filed: Jan. 13, 2012

(65) Prior Publication Data

US 2012/0197448 A1    Aug. 2, 2012

(30) Foreign Application Priority Data

Feb. 1, 2011    (KR) .................. 10-2011-0009882

(51) Int. Cl.
*G06Q 10/00* (2012.01)
*G06Q 10/06* (2012.01)
*G01D 4/00* (2006.01)
*G01D 4/02* (2006.01)

(52) U.S. Cl.
CPC ............... *G06Q 10/06* (2013.01); *G01D 4/004* (2013.01); *G01D 4/02* (2013.01); *Y02B 70/3266* (2013.01); *Y02B 90/242* (2013.01); *Y02B 90/245* (2013.01); *Y02B 90/248* (2013.01); *Y04S 20/242* (2013.01); *Y04S 20/322* (2013.01); *Y04S 20/40* (2013.01); *Y04S 20/52* (2013.01)

(58) Field of Classification Search
None
See application file for complete search history.

(56) References Cited

U.S. PATENT DOCUMENTS

| | | | | |
|---|---|---|---|---|
| 4,463,348 | A * | 7/1984 | Sidebottom | 340/585 |
| 8,090,480 | B2 * | 1/2012 | Brumfield et al. | 700/296 |
| 8,176,095 | B2 * | 5/2012 | Murray et al. | 707/805 |
| 8,649,987 | B2 * | 2/2014 | Steenberg et al. | 702/61 |
| 8,694,163 | B2 * | 4/2014 | Brzezowski | 700/275 |
| 8,719,186 | B2 * | 5/2014 | Amram et al. | 705/412 |
| 8,761,951 | B2 * | 6/2014 | Jerome | 700/295 |
| 2002/0178047 | A1 * | 11/2002 | Or et al. | 705/10 |
| 2003/0010043 | A1 * | 1/2003 | Ferragut, II | 62/126 |
| 2004/0117330 | A1 * | 6/2004 | Ehlers et al. | 705/412 |

(Continued)

OTHER PUBLICATIONS

G. Wood and M. Newborough, "Influencing user behavior with energy information display systems for intelligent homes," International Journal of Energy Research, vol. 31, 2007, pp. 56-78, availale online Aug. 1, 2006.*

(Continued)

*Primary Examiner* — Darrin Dunn
*Assistant Examiner* — Christopher E Everett
(74) *Attorney, Agent, or Firm* — Staas & Halsey LLP

(57) ABSTRACT

An electric device includes a storage unit to store operation information for each period, a controller to generate a power consumption pattern on the basis of the operation information for each period, and generate a consulting message on the basis of a power consumption pattern, and a display to display the consulting message. A power management device includes a communication unit to receive operation information for each period from several electric devices, a controller to generate a consulting message for each electric device, generate a power consumption pattern on the basis of operation information for each period, and generate a consulting message on the basis of the power consumption pattern, and a display to display a consulting message for each electric device. The electric device or the power management device informs a user of a power consumption pattern on the basis of operation- and environmental-information for each electric device.

45 Claims, 10 Drawing Sheets

(56) References Cited

U.S. PATENT DOCUMENTS

| | | | |
|---|---|---|---|
| 2007/0043478 A1* | 2/2007 | Ehlers et al. | 700/276 |
| 2007/0152048 A1* | 7/2007 | Jung et al. | 235/385 |
| 2008/0306985 A1* | 12/2008 | Murray et al. | 707/102 |
| 2010/0042453 A1* | 2/2010 | Scaramellino et al. | 705/7 |
| 2010/0070102 A1* | 3/2010 | Benes et al. | 700/296 |
| 2011/0066442 A1* | 3/2011 | Ayachitula et al. | 705/1.1 |
| 2012/0089269 A1* | 4/2012 | Weaver et al. | 700/295 |
| 2014/0152321 A1* | 6/2014 | Pasek | 324/511 |

OTHER PUBLICATIONS

James Pierce, William Odom, and Eli Blevis. 2008. Energy aware dwelling: a critical survey of interaction design for eco-visualizations. In Proceedings of the 20th Australasian Conference on Computer-Human Interaction: Designing for Habitus and Habitat (OZCHI '08). ACM, New York, NY, USA, pp. 1-8.*

* cited by examiner

TOO LOW TEMPERATURE SETTING CAUSES POWER CONSUMPTION.

CURRENT SET TEMPERATURE: 26°C

POWER OF ABOUT 7.7KWH IS CONSUMED PER DAY WHENEVER INDOOR SET TEMPERATURE IS REDUCED BY 1°C (51.8KWH IS CONSUMED THE ELECTRIC DEVICE IS OPERATED FOR ONE HOUR PER DAY).

IF A DIFFERENCE BETWEEN THE OUTDOOR TEMPERATURE AND THE INDOOR SET TEMPERATURE IS 5°C OR HIGHER, UNNECESSARY POWER CONSUMPTION OCCURS. CURRENT TEMPERATURE DIFFERENCE: 5°C

PLEASE CLEAN OR REPLACE FILTER.

ELECTRIC DEVICE, POWER MANAGEMENT APPARATUS AND METHOD FOR CONTROLLING THE SAME

CROSS-REFERENCE TO RELATED APPLICATIONS

This application claims the benefit of Korean Patent Application No. 2011-0009882, filed on Feb. 1, 2011 in the Korean Intellectual Property Office, the disclosure of which is incorporated herein by reference.

BACKGROUND

1. Field

Embodiments of the present disclosure relate to an electric device, a power management apparatus and a method for controlling the same, which can balance power supply and power demand by informing a user of power consumption.

2. Description of the Related Art

With the development of Information Technology (IT), the number of household appliances powered by electricity is rapidly increasing, in turn leading to increasing power consumption. In order to satisfy such increased power demand, the number of power plants is rapidly increasing. However, as can be seen from a power demand pattern, peak capacity is not reached during most days of the year, that is to say, power plants only operate at full capacity during a few days out of the year.

A state in which a high power demand is required for a short time is called peak load. During periods of peak load, electricity costs the most to generate and deliver, and therefore power providers raise the power rate charged to consumers during periods of peak load. Construction costs for adding an additional power plant to the grid are extremely high and maintenance costs for power plants constructed to maintain peak load for a short period of time are considerable.

Recently, numerous developers have conducted research into a demand management method for temporarily restricting power consumption by limiting peak load without constructing such additional power plants. For the aforementioned purposes, demand management is a focus of attention, and a great deal of research is focused upon an advanced demand management format for demand response (DR).

DR is a system for intelligently managing energy consumption depending upon variation in power rates. For example, the consumer may temporarily stop an air-conditioner so as to reduce power consumption when power rates are high.

By means of the DR, a power-supply source can alter end user power consumption to achieve load balancing and can restrict end user power consumption to periods when demand is low, thereby reducing the user's overall energy expenditure.

Therefore, electric devices to which demand response (DR) is applied have been developed, and an energy management system (EMS) for controlling the driving of the electric device has been developed.

That is, if power rate information is sent to a user through the EMS, the user confirms the power rate information, and may directly turn on or off the electric device on the basis of the confirmed power rate information. Otherwise, the EMS analyzes power rate information and a power consumption restriction condition so that it may turn on or off each electric device or command each electric device to perform the most appropriate operation.

Accordingly, the user is unable to recognize not only a power consumption pattern of each electric device but also power consumption information for each operation of the electric device.

As a result, it is difficult to derive natural power consumption pattern variation of each electric device, and it is impossible for the user to recognize a method for reducing power consumption.

SUMMARY

Therefore, it is an aspect of the present disclosure to provide an electric device, a power management apparatus and a method for controlling the same, which analyze a power consumption pattern on the basis of operation information and environmental information, recognize a user habit on the basis of the analyzed power consumption pattern, and inform the user of a consulting message.

It is another aspect of the present disclosure to provide an electric device, a power management apparatus and a method for controlling the same, which can allow a user to easily recognize how much exceeding power is generated using an icon.

It is another aspect of the present disclosure to provide an electric device, a power management apparatus and a method for controlling the same, which can measure standby power of a general electric device using a smart socket, inform a user of the measured standby power of the general electric device, and displays a consulting message regarding standby power saving for user's recognition.

Additional aspects of the disclosure will be set forth in part in the description which follows and, in part, will be apparent from the description, or may be learned by practice of the disclosure.

In accordance with one aspect of the present disclosure, an electric device includes a storage unit to store operation information for each period; a controller to generate a power consumption pattern on the basis of the operation information for each period, and generate a consulting message on the basis of a power consumption pattern; and a display to display the consulting message.

The consulting message may be habit information of a user who uses the electric device.

The operation information may be at least one of an operation command, power consumption for each period, artificial information, environmental information, and consumable use information.

The electric device may further include a power management unit to measure power for each period; an input unit to receive the operation command from a user; an artificial information detection unit to detect user behavior; and an environmental information detection unit to detect environmental information, wherein the controller generates an operation pattern on the basis of at least one of the environmental information, artificial information, and operation command, and generates a power consumption pattern on the basis of the operation pattern and the power for each period.

The operation command may be at least one of a power on/off signal and a target operation value.

The controller may determine power consumption generated when the electric device is driven at the target operation value, compare the determined power consumption with reference power, and generate a consulting message on the basis of the result of comparison.

The controller may compare the measured power consumption with reference power, and determine the amount of excess power when the measured power consumption exceeds the reference power. The display may display the calculated excess power using a user-recognizable icon.

The storage unit may further include a reference operation value corresponding to the reference power, and the controller may generate a recommended value as a consulting message using the reference value and the reference power.

The storage unit may further store a consulting message corresponding to the target operation value. The controller may search for the consulting message corresponding to the target operation value in the storage unit, and control display of the searched consulting message.

The controller may count the number of target operation value change times, compare the counted number with a reference number, and generate a consulting message on the basis of the result of comparison.

The controller may count the number of operation times corresponding to the power on/off signal for a predetermined time, compare the counted number with a reference number, and generate a consulting message on the basis of the result of comparison.

The controller may determine standby power generated in a standby mode, and generate the determined standby power as a consulting message.

The environmental information detection unit may include at least one of an outdoor temperature detection unit to detect an outdoor temperature and an outdoor humidity detection unit to detect outdoor humidity. The controller may determine power consumption variation on the basis of at least one of the outdoor temperature and the outdoor humidity, and generate a consulting message on the basis of the determined result.

The artificial information detection unit may include at least one of a door opening/closing detection unit to detect door opening/closing, a storage amount detection unit to detect a storage amount of stored food, and a temperature detection unit to detect a storage temperature of stored food on the basis of a chamber temperature variation. The controller may generate a consulting message regarding at least one of the number of door opening/closing times, the storage amount, and the storage temperature.

The artificial information detection unit may include a storage amount detection unit to detect a storage amount of stored objects. The controller may compare the storage amount with a reference amount, count the number of operation times when the storage amount is less than the reference amount, and generate a consulting message regarding the counted number of operation times when the storage amount is less than the reference amount.

The controller may generate a consulting message for each consumable on the basis of the consumable use information.

In accordance with another aspect of the present disclosure, a power management device includes a communication unit to receive operation information for each period from several electric devices; a controller to generate a consulting message for each electric device, generate a power consumption pattern on the basis of operation information for each period, and generate a consulting message on the basis of the power consumption pattern; and a display to display a consulting message for each electric device.

The operation information may be at least one of an operation command, power consumption for each period, artificial information, environmental information, and consumable use information.

The controller may generate an operation pattern on the basis of at least one of the environmental information, artificial information, and operation command, and generate a power consumption pattern on the basis of the operation pattern and the power for each period.

The operation command may be at least one of a power on/off signal and a target operation value.

The controller may determine power consumption generated when the electric device is driven at the target operation value, compare the determined power consumption with reference power, and generate a consulting message on the basis of the result of comparison.

The controller may compare the measured power consumption with reference power consumption, and determine the amount of excess power consumption when the measured power consumption exceeds the reference power consumption. The display may display the calculated excess power consumption using a user-recognizable icon.

The controller may confirm a use period of a consumable mounted to each electric device, compare the confirmed consumable use period with a reference use period of the consumable, and generate a consulting message for the consumable on the basis of the result of comparison.

The controller may determine total power consumption generated in an operation mode for each electric device, generate a consulting message for the determined total power consumption, determine total standby power consumed in a standby mode for each electric device, and generate a consulting message for the determined total standby power.

The communication unit may receive power of an electric device incapable of communicating with others through a smart socket, and the controller may determine standby power of the electric device incapable of communicating with others and generate a consulting message for the determined standby power.

The communication unit may periodically receive the operation information from the electric devices.

In accordance with another aspect of the present disclosure, a method of controlling an electric device includes storing operation information for each period; generating a power consumption pattern on the basis of the operation information for each period; generating a consulting message on the basis of a power consumption pattern; and displaying the consulting message.

The generating of the power consumption pattern may include measuring power; receiving an operation command from a user; generating an operation pattern on the basis of the operation command; and generating a power consumption pattern on the basis of the operation pattern and the power for each period.

The generating of the operation pattern may further include detecting artificial information; detecting environmental information; and reflecting the environment information and the artificial information.

The generation of the consulting message may include receiving a target operation value from among the operation commands from the user; generating comparison information by comparing the target operation value with a reference operation value; calculating power corresponding to the comparison information; and generating a consulting message on the basis of the calculated power.

The generating of the consulting message may include determining whether the target operation value exceeds the reference operation value on the basis of the comparison information; and generating, if the target operation value exceeds the reference operation value, power corresponding to the excess value as a consulting message.

The displaying of the consulting message may include displaying power corresponding to the excess value as a user-recognizable icon.

The method may further include determining power consumption generated when the electric device is driven at the target operation value; comparing the determined power consumption with reference power; and generating a consulting message on the basis of the result of comparison.

The generating of the consulting message may include confirming a use period of each consumable; comparing the confirmed consumable use period with a prestored reference use period; and generating a consulting message regarding the consumable use period when the consumable use period exceeds the reference use period.

The method may further include measuring power; determining total power consumption generated in an operation mode during a predetermined time with total standby power generated in a standby mode; and generating a consulting message for the total power consumption and a consulting message for the total standby power.

In accordance with another aspect of the present disclosure, a method of controlling a power management device includes receiving operation information for each period from several electric devices; generating a consulting message for each electric device, generating a power consumption pattern on the basis of operation information for each period, and generating a consulting message on the basis of the power consumption pattern; and displaying a consulting message for each electric device.

The operation information may be at least one of an operation command, power consumption for each period, artificial information, environmental information, and consumable use information.

The generating of the power consumption pattern may include generating an operation pattern on the basis of at least one of the environmental information, artificial information, and operation command; and generating a power consumption pattern on the basis of the operation pattern and the power for each period.

The generating of the power consumption pattern may include receiving the operation command and a target operation value from each electric device; determining power consumption generated when the electric device is driven at the target operation value; comparing the determined power consumption with reference power; and generating a consulting message on the basis of the result of comparison.

The method may further include confirming which electric device has a target operation value higher than a reference operation value; and controlling the confirmed electric device on the basis of power rates received from a power provider.

The method may further include displaying the confirmed electric device in a different way from the remaining electric devices.

The reference operation value may be any one of a past average value, a value established by the user, and a value of a previous month.

The method may further include determining total power consumption generated in an operation mode of the electric devices; determining total standby power consumed in a standby mode of the electric devices; and generating a consulting message for the total power consumption and a consulting message for the total standby power.

The method may further include classifying the total power consumption according to individual periods; comparing power consumption for each period with reference power consumption, and displaying a power consumption habit of a user as a consulting message.

The method may further include confirming which electric device has the highest standby power; and performing standby power reduction control of the confirmed electric device.

The method may further include receiving power of an electric device incapable of communicating with others through a smart socket; and determining standby power of the electric device incapable of communicating with others and generating a consulting message for the determined standby power.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 4 to 7 exemplarily show a display contained in the power management system according to an embodiment of the present disclosure;

DETAILED DESCRIPTION

Figure 1:
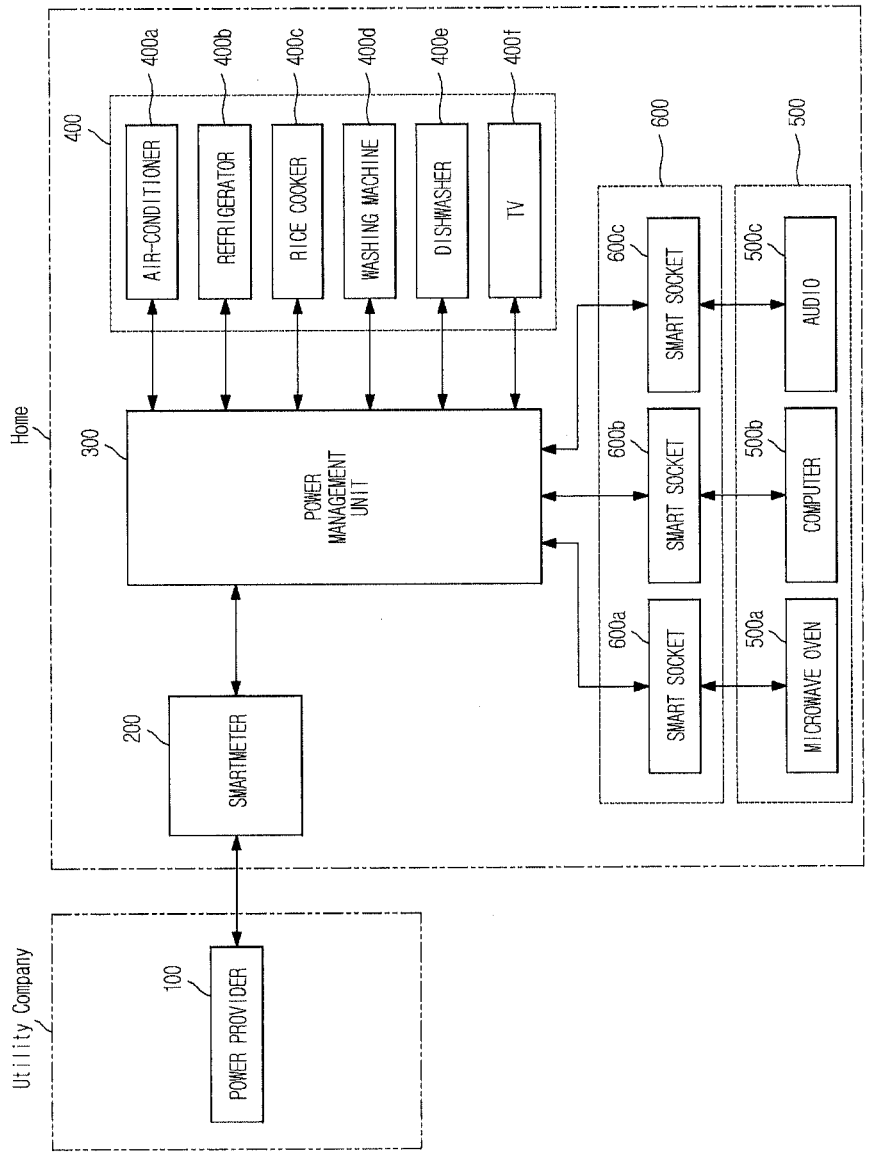
FIG. 1 is a block diagram illustrating a power management system including a power management unit and an electric device according to an embodiment of the present disclosure.

Reference will now be made in detail to the embodiments of the present disclosure, examples of which are illustrated in the accompanying drawings, wherein like reference numerals refer to like elements throughout.

Figure 2:
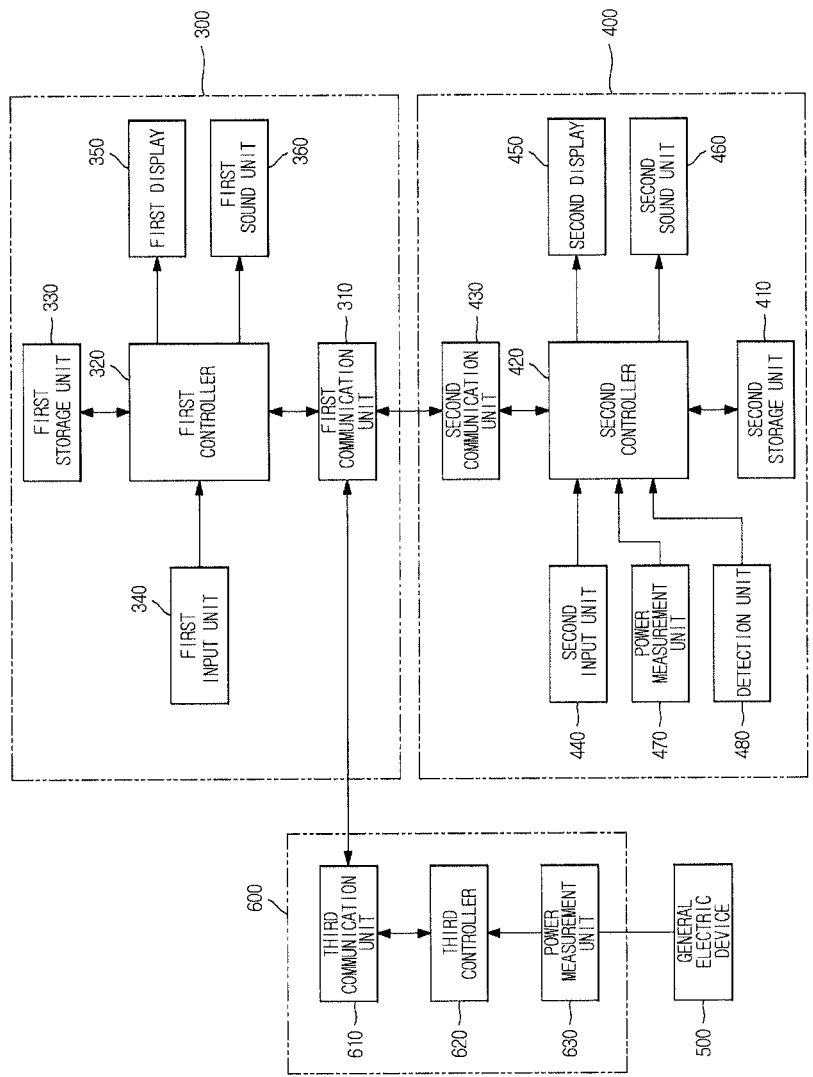
FIG. 2 is a block diagram illustrating a power management unit and an electric device contained in the power management system according to an embodiment of the present disclosure.

FIG. 1 is a block diagram illustrating a power management system including a power management unit and an electric device according to an embodiment of the present disclosure. FIG. 2 is a block diagram illustrating a power management unit and an electric device contained in the power management system according to an embodiment of the present disclosure.

Referring to FIG. 1, the power management system includes a power provider 100, a smartmeter 200, a power management unit 300, electric devices (400, 500) and a smart socket 600. If necessary, the power management unit may also be called an energy management system (EMS).

The power provider 100 is a power supply source that is operated by a power supply company (utility company) which generates and supplies power. The power provider 100 generates the power through atomic energy, hydroelectric power, geothermal power, wind power, etc., and provides the generated power to the electric device (400, 500) installed in homes.

The power provider 100 predicts power consumption on the basis of the generation amount of electric power, the past power consumption information for every season and every period, and weather information, and determines power rates on the basis of the predicted power consumption. In this case, it may also be possible to establish a power rate level corresponding to the predicted power rate as necessary.

The power provider 100 controls power rates of each home to be elastically adjusted in response to power consumption of each home, and provides the adjusted power to each home, such that demand can be balanced.

The power provider 100 collects power consumption amounts of individual homes classified according to individual power rates, and stores the collected power consumption information according to individual power rates, such that the power-supply company calculates power rates (electricity bills) depending upon power consumption for individual power rate levels of each home per month, and charges each home the calculated electricity bills on a monthly basis.

The power provider 100 compares the periodically calculated monthly power rate (monthly bills) with monthly predetermined power rates so as to calculate power bills. If the calculated monthly power rates exceed the monthly predetermined power rates, information about the excess of the monthly predetermined power rates is transmitted to the power management unit 300 installed in the corresponding home, such that an event indicating the excess of monthly predetermined power rates is generated through the power management unit 300 installed in each home.

The power provider 100 stores a threshold power amount for each home, compares power consumption amounts for each home with a threshold power amount, and thus decides a power limitation amount. In this way, the power provider 100 manages the power demand of each home on the basis of the threshold power amount or the monthly predetermined power rates.

The power provider 100 is connected to the smartmeter 200 installed in each home, the power management unit 300, and each electric device (400, 500) over a network, such that data regarding power demand management can be transmitted and received over the network. This network may be any of a wired network, a wireless network, a wired/wireless hybrid network, etc.

The smartmeter 200 is installed in each home, and includes a display such as a liquid crystal display (LCD), such that power consumed in each home is displayed in real time. The smartmeter 200 is an electronic meter, which bidirectionally communicates with the power provider 100 and transmits the consumed power amount to the power provider 100 and the power management unit 300.

The smartmeter 200 receives power rate information from the power provider 100, displays the received power rate information, and transmits the power rate information to the power management unit 300.

In addition, the smart meter 200 may further display a price level corresponding to the power rate information upon receiving the power rate information from the power provider 100, and may also transmit the power rate and price level information to the power management unit 300.

The power management unit 300 may also be referred to as a Demand Response (DR) controller. The power management unit 300 communicates with the smartmeter 200, and thus receives power rate information and power rate level information from the smartmeter 200.

The power management unit 300 communicates with a plurality of electric devices 400 (400*a* to 400*f*) such that it receives operation information for consulting from the electric devices 400 (400*a* to 400*f*). The power management unit 300 displays a consulting message for a power consumption habit of a user who uses the electric devices 400 (400*a* to 400*f*).

The power management unit 300 controls the operations of the electric devices 400 (400*a* to 400*f*) on the basis of a power rate level of the power provider 100, and power consumption of the electric devices 400 (400*a* to 400*f*) into which a user's power consumption habit for each electric device is reflected.

The power management unit 300 may also establish a power rate level on the basis of power rates upon receiving the power rates from the power provider 100.

The power management unit 300 receives information about excess monthly threshold power and information about excess monthly predetermined power rates from the power provider 100, and informs the user of the received information.

When the power management unit 300 compares the predicted (or current) power amount for each hour with the allowed instantaneous power amount, if the predicted (or current) power amount for each hour is equal to or greater than the allowed instantaneous power amount, operation of the electric device 400 is controlled according to predetermined priorities, and the controlled result is output so as to inform the user of the controlled result.

Referring to FIG. 2, the power management unit 300 includes a first communication unit 310, a first controller 320, a first storage unit 330, a first input unit 340, a first display 350, and a first sound unit 360.

The first communication unit 310 receives power rate information from the smartmeter 200 and power rate level information corresponding to the received power rate information from the smartmeter 200 by communicating with the smartmeter 200, and transmits the received information to the first controller 320.

The first communication unit 310 receives consulting operation information from the electric device 400 by communicating with the electric devices 400, transmits the received information to the first controller 320, receives the operation control signal of the electric devices from the first controller 320, and transmits the received operation control signal to the electric devices 400.

In this case, the consulting operation information may include at least one of an operation command, environmental- and artificial-information for affecting the operation of electric devices, consumables required for operating the electric device, total power consumption requisite for the operation mode, and total standby power information requisite for the standby mode.

The operation command may include the number of actual operation times corresponding to the number of on and off operations generated in a predetermined period, a target operation value, and the like. Therefore, the operation information may further include an operation time for a target operation value, power consumption per hour for each target operation value, and the number of changed target operation values.

The environmental and artificial information are detected by the detection unit 480 of the electric device 400. The environmental information may be at least one of indoor temperature information, indoor humidity information, outdoor temperature information, and chamber temperature information. The artificial information may be at least one of door opening/closing information of a refrigerator or kimchi refrigerator, and the amount of storage such as food stored in the electric device.

Upon receiving the consulting operation information from at least one electric device 400 (400*a* to 400*f*), the first controller 320 generates a power consumption pattern on the basis of the received operation information, generates a consulting message for the power consumption pattern for each electric device 400 (400*a* to 400*f*), and controls the first display 350 to display the generated consulting message.

Upon receiving the consulting operation information from at least one electric device 400 (400*a* to 400*f*), the first controller 320 may count the number of operation information segments.

That is, whenever the target operation value is received from at least one electric device, the first controller 320 recognizes the transmitted target operation value. The first controller 320 may count the number of change times of the target operation value, and the operation time for each target operation value. The first controller 320 may count the number of operation times on the basis of a power on/off signal of at least one electric device, and may generate a consulting message by comparing the counted information with reference information.

In this case, the reference information may include a reference operation value, reference power for predetermined hours consumed for operation, a reference usage time for consumables, the reference number of operation times, and the reference number of change times.

Such reference information may be generated on the basis of information acquired by learning, average information of past information, information stored in manufacturing, user setup information, and information generated in a predetermined time.

Whenever the first controller 320 receives operation information from the electric device 400, it may generate a consulting message by counting the received information, or may generate a consulting message by periodically receiving information.

The first controller 320 compares a target operation value with a reference operation value, extracts a target operation value deviating from the reference operation value, and generates power corresponding to the deviated value as a consulting message.

In this case, the first controller 320 compares power consumed for an operation time operated by a target operation value with reference power calculated on the basis of reference power per predetermined hours. If the power consumption exceeds the reference power, the first controller 320 generates a consulting message corresponding to the excess of power.

In addition, the first controller 320 may consider a power consumption variation affected by correlation of environmental information.

The first controller 320 may count the number of operation times for a predetermined time, and compare the number of counted operation times with a reference number of operation times, so that it may generate a consulting message regarding the number of operation times.

The first controller 320 may generate a consulting message regarding artificial information affecting power consumption of the electric device 400. For example, in the case of a refrigerator, artificial information may include the number of door opening/closing times, information regarding the storage amount, storage temperature information, etc.

That is, upon receiving information about the number of door opening/closing times generated during a predetermined time from a refrigerator acting as the electric device 400, the first controller 320 compares the received information with a reference number of door opening/closing times, and generates power consumption information corresponding to the number of door opening/closing times higher than the reference number as a consulting message. Upon receiving storage amount detection information from the refrigerator, the first controller 320 compares the detected storage amount with a reference storage amount, and generates power consumption information corresponding to the storage amount exceeding the reference storage amount as a consulting message.

Upon receiving a door opening/closing detection signal from the refrigerator acting as the electric device 400, the first controller 320 counts the number of door opening/closing times, compares the counted number of door opening/closing times with a predetermined reference number of door opening/closing times, and may generate power consumption information corresponding to the number of door opening/closing times exceeding the reference number of door opening/closing times as a consulting message.

The first controller 320 may provide a user with recommended setup information on the basis of reference information.

The first controller 320 compares use period information of consumables contained in several electric devices with reference use period information, and generates a consulting message about replacement or cleaning of consumables.

The first controller 320 receives power consumption pattern information from several electric devices, compares the received power consumption pattern information for each electric device with reference power consumption, and generates information indicating the proximity to reference power consumption for each electric device. In this case, reference power consumption for each electric device during a predetermined time may be pre-established.

Upon receiving power consumption pattern information from several electric devices, the first controller 320 stores the power consumption pattern information at intervals of a predetermined time, and generates a consulting message.

In addition, the first controller 320 provides a user with a variety of consulting messages, informs the user of a current power consumption situation, and enables the user to recognize the problem of a power consumption pattern. As a result, the first controller 320 causes the user to have a good habit when using the electric device, so that the user may have a good or satisfactory habit of using power. As a result, the user can naturally reduce power consumption for each electric device.

The first controller 320 monitors standby power of the smart electric device 400 and the general electric device 500, and generates a consulting message for the standby power.

The first controller 320 receives power consumption from the smart electric device 400 so as to determine the standby power, or directly receives the standby power from the smart electric device 400 so as to generate a consulting message for the standby power.

In addition, the first controller 320 receives power consumption of the general electric device 500 through the smart socket 600, determines standby power from among the received power consumption, and generates a consulting message for the standby power for each electric device.

In this way, the power management unit 300 generates a consulting message for the standby power, informs power consumption caused by the standby power for each electric device 400 or 500, and commands the user to cut off the standby power.

The first controller 320 predicts power consumption additionally generated by a user habit of using the electric device 400, and controls the electric device 400 on the basis of the predicted power consumption and power rates.

The first storage unit 330 stores user information. In this case, the user information may include the monthly threshold power amount, the monthly predetermined power rate, the allowed power for each hour, and personal user information.

The first storage unit 330 stores operation information of several electric devices 400 for each period.

The first input unit 340 receives user information and transmits the same to the first controller 320. The first input unit 340 receives the priority information of several electric devices and transmits the same to the first controller 320.

The first input unit 340 includes a button (not shown) for providing the consulting message. If the user presses this consulting message button, the first input unit 340 transmits an operation signal activated by the consulting message button to the first controller 320.

When the consulting message button is operated, the first input unit 340 outputs a button for providing a sub-list of the consulting message button upon receiving the operation signal from the first controller 320.

Figure 3:
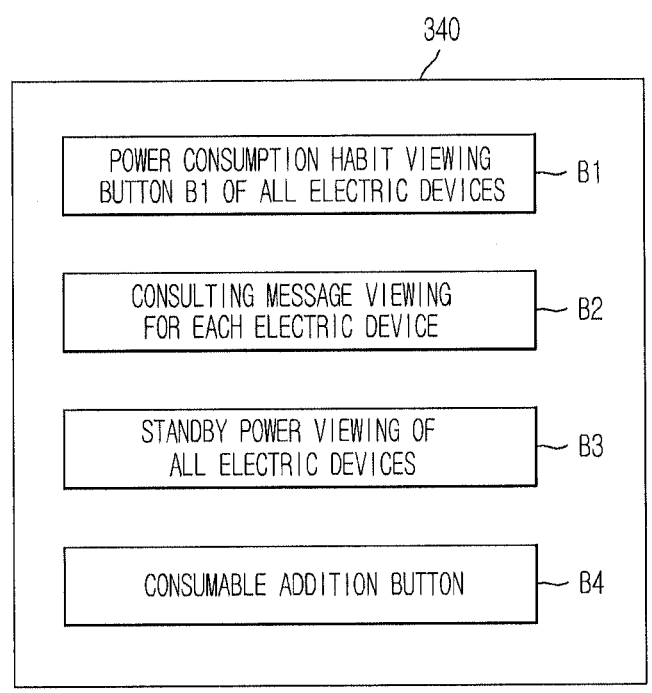
FIG. 3 exemplarily shows an input unit contained in the power management unit according to an embodiment of the present disclosure.

That is, the sub-list providing button is shown in FIG. 3. Referring to FIG. 3, the sub-list providing button may include a power consumption habit viewing button B1 of all the electric devices, a consulting message viewing button B2 for each electric device, a standby power viewing button B3 of the entire electric device, and a consumable addition button B4.

The first input unit 340 generates the list of several electric devices if the user selects the consumable addition button B4. If one of the electric devices is selected, the first input unit 340 generates the list of consumables mounted to the selected electric device. If one of the generated consumables is selected, the first input unit 340 generates consumable addition information of the corresponding electric device to the first controller 320 in such a manner that a consulting message for the selected consumable can be generated.

The first input unit 340 and the first display 350 are integrated into one body, and the first input unit 340 may be configured in the form of a touchscreen.

The first display 350 displays any one of power rates and power rate level of a current hour or any one of power rates and power rate levels for each hour of one day, and displays an operation state of the operating electric device.

The first display 350 displays information corresponding to the operation signal of the first input unit 340.

A detailed description of the above-mentioned constituent elements will be described with reference to FIGS. 4 to 7.

Figure 4:
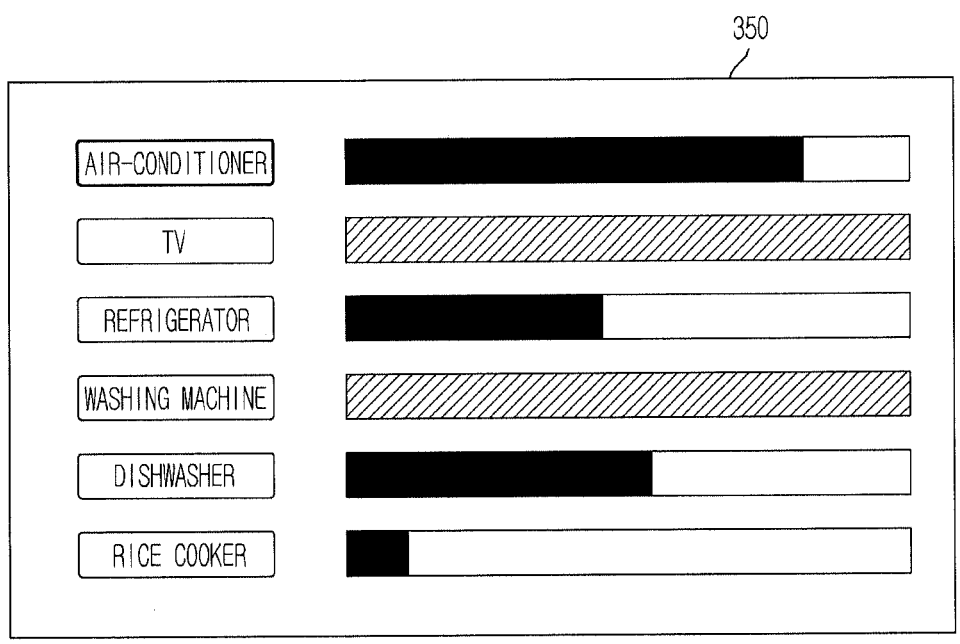

FIG. 4 exemplarily shows the power consumption habit of all the electric devices 400 displayed on the first display 350. If the power consumption habit viewing button B1 of all the electric devices is selected through the first input unit 340, the power consumption habits of all the electric devices is displayed in the form of a rate graph under the control of the first controller 320.

That is, the power management unit determines how many times total power consumption of each electric device approaches reference power consumption during a predetermined time, compares the determined number of times with a predetermined reference number of times so as to calculate a predetermined ratio of each electric device, and displays the calculated ratio. In this case, if the calculated ratio for each electric device is greater than a reference ratio, the corresponding ratio is displayed as a red bar graph (oblique-lined part). Otherwise, if the calculated ratio is less than the reference ratio, the corresponding ratio is displayed as a black bar graph.

Through the above-mentioned graphs shown in FIG. 4, it is possible to recognize a power consumption habit for each electric device.

In other words, if the power consumption habit of the corresponding electric device is determined to be bad, this result is represented by a red bar graph. If the power consumption habit of the corresponding electric device is determined to be good, this result is represented by a black bar graph.

Referring to FIG. 4, a power consumption habit of a TV or a washing machine is bad, a power consumption habit of the air-conditioner is normal, and a power consumption habit of a dishwasher, an electric rice cooker, or a refrigerator is good.

FIG. 5 exemplarily shows the consulting message displayed on the first display 350. If the consulting message viewing button B2 for each electric device is selected through the first input unit 340, the list of several electric devices is generated. If at least one of the electric devices is selected by the user, a consulting message of the selected electric device is displayed under the control of the first controller 320.

FIG. 5 exemplarily shows the consulting message of the air-conditioner.

Referring to FIG. 5, the first display 350 displays a current setup temperature of 26° C., monthly power consumption of 51.8 kWh when the electric device is used for one hour each day, and a current temperature difference of 5° C.

The following consulting message for the air-conditioner is displayed for user recognition as shown in FIG. 5. The consulting message is "Too low temperature setting causes power consumption. Power of about 7.7 kWh is consumed per day whenever an indoor set temperature is reduced by 1° C. If a difference between the outdoor temperature and the indoor set temperature is 5° C. or higher, unnecessary power consumption occurs. Please clean or replace filter."

As to power additionally consumed by a user habit, power consumption according to either operation condition setup information or artificial information may be represented by an icon, and a detailed description thereof will hereinafter be given with reference to FIG. 6.

Figure 6:
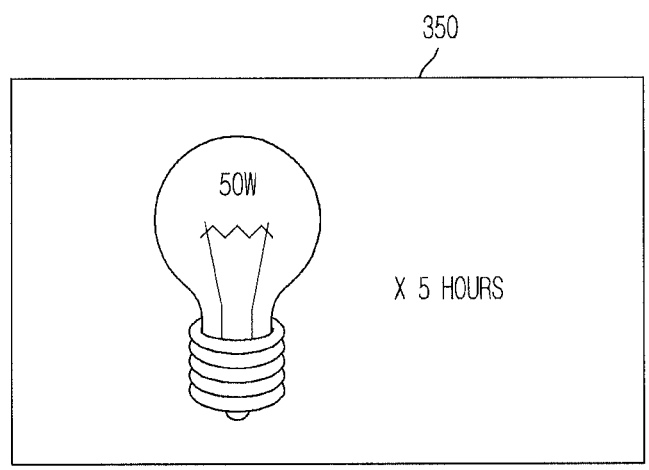

FIG. 6 exemplarily shows an icon of excess power consumption displayed on the first display 350.

If power consumption consulting is achieved using quantitative numerical values, the user may have difficulty in recognizing power. Therefore, in order for the user to more easily recognize power, a user-friendly icon such as a bulb-shaped or fan-shaped icon is used to display the consulting message.

As shown in FIG. 6, in order for the user to intuitively recognize power consumption, a general 50 W bulb is represented by an icon.

For example, the number of door opening/closing times of a refrigerator is monitored. If the number of monitored door opening/closing times of the refrigerator exceeds a reference number of door opening/closing times, power corresponding to the excess number of times is displayed as a bulb-shaped icon.

That is, power consumption generated when the door is opened/closed only once is similar to power consumption generated when the 50 W bulb is turned on for 8 minutes. Thus, if the number of door opening/closing times of the refrigerator exceeds the reference number of door opening/closing times by 40 times within a predetermined period of time, the first display 350 displays the 50 W bulb and its turn-ON time of 5 hours, so that the user can intuitively recognize power consumption corresponding to the excess number of times.

In addition, the first display 350 may also display information indicating how many times total power consumption exceeds maximum power consumption within a predetermined time using an icon.

Figure 7:
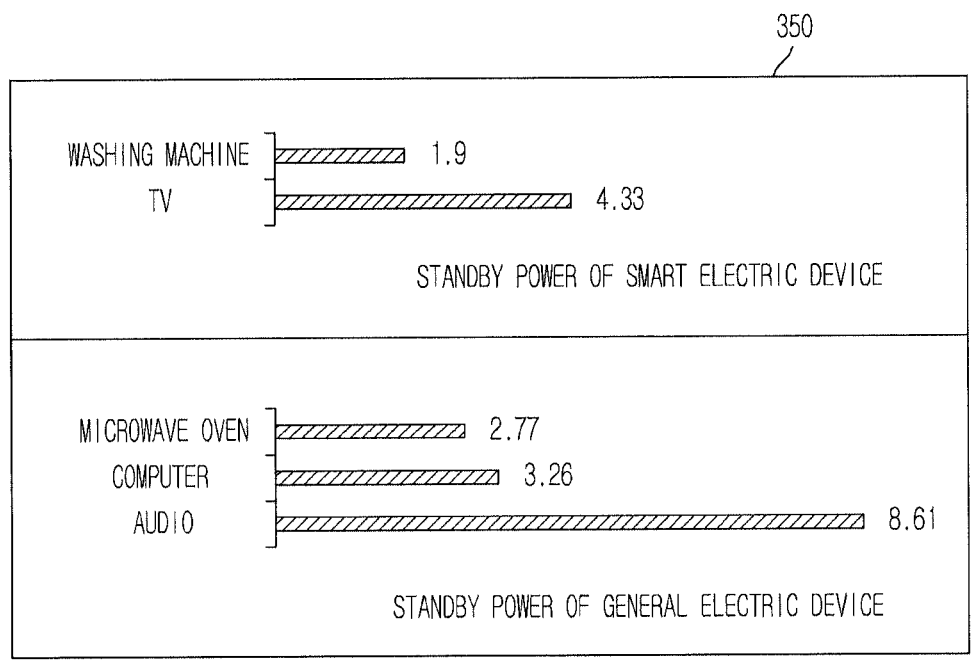

FIG. 7 exemplarily shows a standby power graph displayed on the first display 350. Referring to FIG. 7, if a standby power view menu B3 of all electric devices is selected through the first input unit 340, the first display 350 displays standby power of all the electric devices 400 and 500 according to a control signal of the first controller 320.

In this case, standby power of the smart electric device 400 and standby power of the general electric device 500 may also be separately displayed on the first display 350.

In this way, the first display 350 displays the standby power of respective electric devices 400 and 500, so that a consulting message requesting that a user pull a power plug of a high-standby-power electric device out of an AC power socket may be displayed on the first display 350.

In the case of the smart electric device 400, if the power plug is pulled out of the AC power socket, it is impossible to control communication and operations of the smart electric device 400 through the power management unit 300. Therefore, another consulting message for reducing standby power of a general electric device not controlled by the power management unit 300 may also be displayed on the first display 350 as necessary.

That is, as shown in FIG. 7, standby power of an audio device is higher than those of other electric devices, the first display 350 displays the following consulting message "Please disconnect audio set and smart socket coupled to the audio set from AC power".

Therefore, the power management unit may invite the user to change his or her habit of using the corresponding electric device so as to reduce standby power consumption.

The first sound unit 360 audibly outputs the consulting message.

The first sound unit 360 audibly outputs information about the excess of the allowed power, information about the excess of the monthly threshold power, and information about the monthly predetermined electricity bills.

The electric devices (400, 500) are classified into a smart electric device 400 (400a to 400f) that measures power consumption and communicates with the power management unit 300, and a general electric device 500 (500a to 500c) that does not measure power consumption or communicate with the power management unit 300.

The smart electric device 400 may be all kinds of power consumption devices that receive power rate information or operation command from the power management unit 300 by wire or wirelessly and operate in response to the received power rate information or operation command. The smart electric device 400 monitors power consumption and operation information in real time, and transmits the monitored information to the power management unit 300 by wire or wirelessly. In other words, the smart electric device 40 transmits power consumption information for each operation condition to the power management unit 300, and may be operated upon receiving either a command from the user or a command from the power management unit 300.

The smart electric device 400 shown in FIG. 1 includes an air-conditioner 400a, a refrigerator 400b, an electric rice cooker 400c, a washing machine 400d, a dishwasher 400e, and a television 400f that are different from one another in terms of function. However, the above-mentioned electric devices are similar to one another in a constituent element for the consulting function, so that they are generically named a smart electric device in the following description.

The control elements of the above-mentioned smart electric device 400 will hereinafter be described with reference to FIG. 2.

Referring to FIG. 2, the smart electric device 400 includes a second storage unit 410, a second controller 420, a second communication unit 430, a second input unit 440, a second display 450, a second sound unit 460, a power measurement unit 470, and a detection unit 480.

The second storage unit 410 stores a device name and operation information for the consulting function at intervals of a predetermined time, stores reference information for each operation information, and stores reference power consumption assigned to a predetermined time. The reference power consumption may be established to prevent unnecessary power consumption.

For example, if the smart electric device is a refrigerator or a kimchi refrigerator, reference information to be stored in the second storage unit 410 includes a reference number of door opening/closing times, power consumption for each opening/closing time, reference storage amount of food stored in the refrigerator or the kimchi refrigerator, reference storage temperature information of food, power consumption corresponding to the excess storage amount, and power consumption corresponding to the excess storage temperature. If the smart electric device is an electric device driven by a user command, for example, a washing machine, a dishwasher, or a drying machine, reference information stored in the second storage unit 410 stores average power consumed when the electric device including a predetermined number of objects to be cleaned or dried is driven once. In addition, if the smart electric device is any one of a refrigerator, a kimchi refrigerator, and an air-conditioner, each of which may generate additional power consumption according to a consumable state, reference information to be stored in the second storage unit 410 may include power consumption information for each consumable state.

In this case, the consumable state may be determined on the basis of use time of each consumable, or may also be directly detected using the detection unit.

For example, if a consumable is a filter, a filter state may be detected using the detection unit. If the consumable is refrigerant, a refrigerant state may be detected using a refrigerant-amount detection unit.

In this case, consulting operation information may be at least one of an operation command, environmental- and artificial-information affecting electric device operation, consumable information requisite for electric device operation, total power consumption information consumed for the electric device operation, and total standby power information for a standby state.

The operation command may include a target operation value, power on/off value, etc.

In addition, the operation information may further include the number of actual operations corresponding to the number of power on/off times during a predetermined time, a target operation value, an operation time operated as a target operation value, power consumption per predetermined time for each target operation value, and the number of target operation value change times.

The environmental and artificial information may be detected by the detection unit 480 of the electric device 400. The environment information may be at least one of indoor temperature information, indoor humidity information, outdoor temperature information, and chamber temperature information. The artificial information may be at least one of door opening/closing information of a refrigerator or kimchi refrigerator, the amount of storage such as stored food, storage temperature information, a washing machine, a drying machine, and storage amount information of a dishwasher.

The second storage unit 410 may also store a consulting message corresponding to the target operation value. Therefore, upon receiving the target operation value, the second controller 420 may search for a consulting message corresponding to the target operation value, and may control display of the retrieved consulting message.

The second controller 420 recognizes a target operation value whenever an operation command is entered via the second input unit 440, counts the number of target operation value change times, an operation time for each target operation value, counts the artificial information transmitted to the detection unit 480, stores the counted information in the second storage unit 410, or periodically controls transmission of the power management unit 300.

The second controller 420 compares the counted information and detection information detected through the detection unit 480 with reference information so as to generate a consulting message, and control the driving of the second display 450 so as to display the generated consulting message.

In more detail, the second controller 420 compares each of the operation information transmitted from the second input unit 440 with the number of power on/off times, a target operation value, the number of target operation value change times, and an operation time of the target operation value with reference information, and thus generates a consulting message.

In addition, the second controller 420 identifies artificial and environmental information detected by the detection unit 480, compares each of the environmental and artificial information with reference information, generates the comparison result information, and generates a consulting message on the basis of the comparison resultant information and operation information.

In addition, the second controller 420 classifies information stored in the first storage unit 410 into consumable information, total power consumption information, and total standby power information. The second controller 420 compares each of the classified consumable information, total power consumption information, and total standby power information with reference information, generates the comparison result information, and generates a consulting message on the basis of the comparison result information.

In this case, the reference information may be a reference operation value, the reference number of operation change times, the number of reference operation times, power consumption per predetermined time for each target operation value, a reference use time of a consumable, etc.

Such reference information may be any one of information acquired by learning, average information of past information, information stored in a manufacturing process, information decided by a user, and previous month information, etc.

The second controller 420 compares the target operation value with a reference value, extracts a target operation value deviating from the reference value, recognizes power consumption when the electric device is driven by the extracted target value, and generates a consulting message using the confirmed power consumption.

In this case, the second controller 420 may generate a consulting message in consideration of operation variation caused by environment information and power consumption variation.

The second controller 420 compares the target operation value with a reference value so as to calculate a difference between the target operation value and the reference value, and may generate a consulting message for power corresponding to the difference. In this case, a power value per predetermined time of the target operation value and a power value per predetermined time of a reference operation value are prestored, so that power obtained by subtraction of a difference between two power values may be generated as a consulting message.

The second controller 420 counts the number of operations based on the power on/off signals, compares the counted number of operations with a reference number of operations, compares the number of actual operations with the reference number of operations during a predetermined time, and generates a consulting message.

The second controller 420 generates a consulting message for artificial information affecting power consumption of the electric device 400.

For example, if the electric device 400 is a refrigerator, the artificial information may be the number of door opening/closing times, storage amount information, storage temperature, etc.

That is, the second controller 420 generates the excess number of door opening/closing times, power consumption corresponding to the excess number as a consulting message, generates the excess storage amount and power consumption corresponding to the excess storage amount as a consulting message, and generates power consumption corresponding to the excess storage temperature as a consulting message.

In addition, the first controller 320 may also provide recommended setup information to the user on the basis of reference information.

The second controller 420 compares a consumable use period indicating consumable information requisite for operation with a reference use period, and generates a consulting message for replacement or cleaning of the consumable on the basis of the comparison result.

In this case, the consumable for use in a refrigerator, a kimchi refrigerator, or an air-conditioner may be any one of a refrigerant or filter.

The second controller 420 compares total power consumption stored in the second storage unit 410 with reference power consumption, so that the approaching rate of total power consumption approaching the reference power consumption is generated as a consulting message.

In this way, the user can recognize how much total power consumption for each electric device approaches the reference power consumption by referring to the consulting message.

In addition, the second controller 420 provides a variety of consulting messages for each electric device to a user so as to inform the user of current power consumption, so that the user can recognize power consumption problems. As a result, the user may attempt to have a good habit of using the electric device, so that the user may effectively reduce power consumption for each electric device.

The second controller 420 generates a consulting message for standby power stored in the second storage unit 410.

In this way, the second controller 420 generates a consulting message for standby power so as to inform the user of power consumption caused by standby power, so that the user can block standby power of the electric device.

The second controller 420 predicts power consumption variation on the basis of detection information affecting the operation, and generates a consulting message on the basis of the predicted power consumption variation.

In this case, the detection information affecting the operation may include door opening/closing detection information and indoor temperature detection information in the case of the refrigerator or the kimchi refrigerator. In the case of the air-conditioner, the detection information may include indoor temperature detection information, outdoor temperature detection information, humidity detection information, etc.

In the case of the refrigerator or the kimchi refrigerator, the target operation value may be a target chamber temperature. In case of the air-conditioner, the target operation value may be an indoor target temperature. In the case of a dishwasher or a washing machine, the target operation value may be water temperature. In the case of a television (TV), the target operation value may be volume, channel, and screen brightness. In the case of the electric rice cooker, the target operation value may be a warming time, etc.

In addition, the number of target operation value change times may further include the number of channel change times.

The second communication unit 430 transmits consulting operation information to the first communication unit 310 of the power management unit 300 upon receiving a command from the second controller 420. The second communication unit 430 transmits an operation control signal received from the first communication unit 310 of the power management unit 300 to the second controller 420.

In addition, whenever the operation condition is changed by the user, the second communication unit 430 may also transmit operation condition setup information.

The second communication unit 430 communicates with the power management unit 300, so that it may directly receive power rates and power rate level information corresponding to the power rates from the power management unit 300.

In this case, the second controller 420 may control the operation of the electric device 400 on the basis of additional power consumption and power rates generated by the user's habit.

The second input unit 440 receives a driving indication signal from the user, or receives drive reservation time information from the user, and transmits the received signal or information to the second controller 420.

The second input unit 440 receives user information and transmits the same to the first controller 320. Upon receiving priority information of several electric devices, the second input unit 440 transmits the received priority information to the first controller 320.

The second input unit 440 includes a button for setting a target operation value. If the button for setting the target operation value is pressed by the user, the second input unit 440 receives the target operation value corresponding thereto, and transmits the received target operation value to the second controller 420.

For example, in the case of the refrigerator or kimchi refrigerator, a button for setting a target chamber temperature may be used. In the case of the air-conditioner, a button for setting a target indoor temperature may be used. In the case of the washing machine or dishwasher, a button for setting water temperature may be used. In the case of the television (TV), a volume button and a screen setup button may be used. In the case of the electric rice cooker, a warming time setup button may be used.

The second input unit 440 includes a button (not shown) for providing a consulting message. If the user presses the consulting message providing button, the second input unit 440 transmits a control signal corresponding to the pressed button to the second controller 420.

If the user presses the consulting message providing button, the second input unit 440 may generate a sub-list providing button for providing the consulting message upon receiving a command from the second controller 420.

Figure 8:
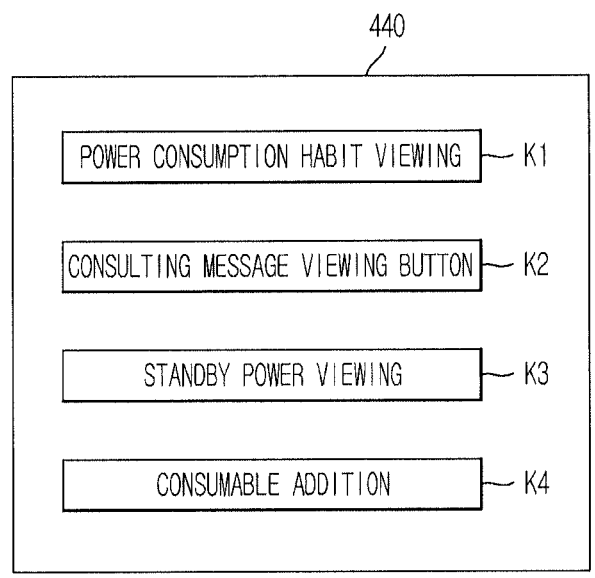
FIG. 8 exemplarily shows an input unit contained in the electric device according to an embodiment of the present disclosure.

That is, the sub-list of the consulting message providing button is exemplarily shown in FIG. 8, and includes a power consumption habit viewing button K1, a consulting message viewing button K2, a standby power viewing button K3, and a consumable addition button K4.

If the user selects or presses the consumable addition button K4, the second input unit 440 generates a list of consumables. If any one of the consumables is selected from among the generated consumable list, addition information of the corresponding consumable is transmitted to the second controller 420 in such a manner that a consulting message for the selected consumable can be generated.

The second input unit 440 and the second display 450 are integrated into one body, and the second input unit 440 may be configured in the form of a touchscreen.

The second display 450 displays power rates, operation levels, and operation states.

The second display 450 displays any one of power rates and power rate level of a current hour or any one of power rates and power rate levels for each hour of one day, and displays an operation state of the operating electric device.

The second display 450 displays information corresponding to the operation signal of the second input unit 440.

If the power consumption habit viewing button K1 is selected through the second input unit 440, the power consumption habits of all the electric devices are displayed in the form of a rate upon receiving a command from the second controller 420.

The power management unit determines how many times total power consumption of each electric device approaches reference power consumption during a predetermined time, compares the determined number of times with a predetermined reference number of times so as to calculate a predetermined ratio of each electric device, and displays the calculated ratio. In this case, if the calculated ratio for each electric device is greater than a reference ratio, the corresponding ratio is displayed as a red bar graph (oblique-lined part). Otherwise, if the calculated ratio is less than the reference ratio, the corresponding ratio is displayed as a black bar graph.

If the consulting message viewing button K2 is selected through the second input unit 440, the second display 450 displays a consulting message upon receiving a command from the second controller 420.

In association with power additionally consumed by the user's habit, power consumption caused by operation condition setup information or artificial information may be represented as an icon.

Therefore, the user can more easily recognize the excess power.

If the standby power viewing button K3 is selected through the second input unit 440, the second display 450 displays standby power generated for a predetermined time upon receiving a command from the second controller 420.

The second display 450 displays any one of power rates and power rate level of a current hour or any one of power rates and power rate levels for each hour of one day, and displays an operation state of the electric device.

The second sound unit 460 outputs a sound signal at a driving start time or driving end time, informs the user of an operation start time or operation end time, and audibly outputs the consulting message.

The power measurement unit 470 measures power consumption of the operating electric device 400 in real time, and transmits the measured power to the second controller 420, so that it may detect actual power consumed by the electric device 400. In addition, the power measurement unit 470 may update total power consumption information or total standby power information stored in the second storage unit 410.

The power measurement unit 470 measures power consumption of the electric device 400 using not only a voltage detected at both ends of the AC power line coupled to the power connector of the electric device 400 but also a current detected at any line of AC power lines coupled to the power connector.

The detection unit 480 includes at least one of an artificial information detection unit for detecting user behavior but not input information entered by the input unit and an environmental information for detecting a natural phenomenon variation affecting the electric device operation. In the case of the refrigerator or kimchi refrigerator, the artificial information detection unit may include a door opening/closing detection unit, a storage amount detection unit, and a chamber temperature detection unit. In the case of a washing machine, a dishwasher, or a drying machine, the artificial information detection unit may include a target-object-amount detection unit (e.g., a laundry amount detection unit or a dish amount detection unit).

In the case of the refrigerator or kimchi refrigerator, the environmental information detection unit may include an indoor temperature detection unit and an indoor humidity detection unit. In the case of the air-conditioner, the environmental information detection unit may include an outdoor temperature detection unit, an outdoor humidity detection unit, etc.

The detection unit 480 detects at least one of the environmental information and the artificial information, and transmits the detected information to the second controller 420.

In this case, the environmental information and the artificial information may cause the operation variation so as to change power consumption. In the case of the refrigerator or kimchi refrigerator, the artificial information may include door opening/closing information, storage amount information, storage temperature information, etc. In the case of the refrigerator or kimchi refrigerator, the environmental information may include indoor temperature information and chamber temperature information. In the case of the air-conditioner, the environmental information may include indoor temperature information, outdoor temperature information, humidity information, etc.

User-selected operations of the general electric devices (500a, 500b, 500c) may be performed. The general electric devices may be coupled to the smart sockets (600a, 600b, 600c), respectively, so that they receive power through the smart sockets (600a, 600b, 600c) and their power consumption is measured by the smart sockets (600a, 600b, 600c).

The smart sockets (600a, 600, 600c) are coupled to the general electric devices (500a, 500b, 500c), respectively. Each smart socket includes a terminal inserted into a commercial power socket and a groove coupled to a plug of the general electric device, and also includes an ID number or code in such a manner that the user can identify individual smart sockets.

In this case, the ID number or code may be printed or engraved on the smart socket, and the code may be a barcode or Quick Response (QR) code.

The smart socket 600 includes a third communication unit 610 communicating with the power management unit 300, a third controller 620 for controlling communication of the third communication unit 610, and a power measurement unit 630 for measuring power consumption of the general electric device. That is, the smart sockets (600a, 600b, 600c) have the same structure.

The third communication unit 610 communicates with the first communication unit of the power management unit 300, and transmits power consumption of the general electric device to the first communication unit of the power management unit.

The third controller 620 controls the driving of the power measurement unit 630 so as to measure or monitor power of the general electric device, and controls transmission of the measured or monitored power. Specifically, in a standby mode of the general electric device, the third controller 620 measures standby power and transmits it to the power management unit 300.

The power measurement unit 630 measures power consumption of the general electric device using not only a voltage detected at both ends of the AC power line coupled to the power connector of the general electric device but also a current detected at any power line of AC power line coupled to the power connector, and transmits the measured power to the power management unit 300 through the third communication unit 610.

The smart socket may further include a blocking unit (not shown) such as a switch. Accordingly, if a large amount of standby power is generated from the general electric device coupled to the smart socket, the blocking unit is driven so that generation of standby power may be interrupted.

Figure 9:
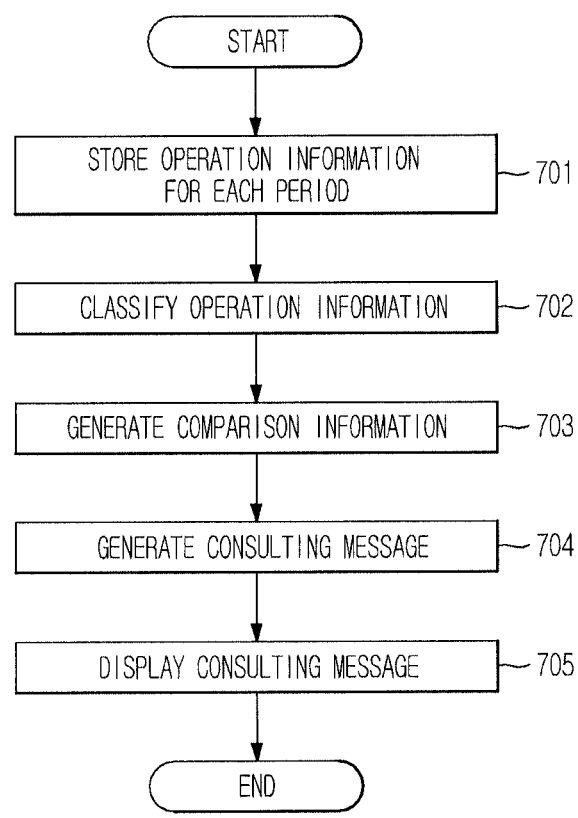
FIG. 9 is a flowchart illustrating a method for controlling the electric device according to an embodiment of the present disclosure.

FIG. 9 is a flowchart illustrating the smart electric device 400 according to one embodiment of the present disclosure.

The smart electric device 400 determines whether the power on/off operation corresponding to the operation beginning or an operation command such as a target operation value for setting the operation condition is entered or not.

Upon receiving the target operation value from the second input unit 440, the smart electric device 400 stores the received target operation value or controls operation execution on the basis of the target operation value. Whenever the target operation value is changed through the second input unit 440, the smart electric device 400 recognizes the changed target value, counts the number of target operation value change times, counts/stores an operation time for each target value, and measures/stores power consumed during an operation time for each target value.

The smart electric device 400 periodically detects environmental information and artificial information while in operation, periodically recognizes consumable information, and stores environmental information and consumable use information.

For example, if the smart electric device 400 is a refrigerator or kimchi refrigerator, artificial information from among the detection information transmitted to the detection unit 480 is stored. For example, the smart electric device 400 may count the number of door opening/closing times, a door opening time, information of the detected storage amount, and storage temperature.

That is, the smart electric device 400 stores a variety of operation information affecting the operation of the smart electric device 400 at every period, for example, an operation command, artificial information, environmental information, and consumable use information at operation 701.

If a current time reaches a consulting message provision time, the smart electric device 400 classifies a variety of operation information stored in the second storage unit 410 according to individual information types at operation 702. The classified operation information is compared with reference information, the smart electric device 400 generates comparison information at operation 703, generates a consulting message using the generated comparison information at operation 704 and displays the generated consulting message at operation 705.

Detailed description of the above-mentioned operations 701 to 705 will hereinafter be given.

The smart electric device 400 compares a target operation value from among the operation information with a reference value, and extracts a target value deviating from the reference value. When the smart electric device 400 is operated at the extracted target operation value, power consumed by the smart electric device 400 is measured. In this case, it may also be possible to calculate power consumption on the basis of an operation time of the electric device operating at the target value.

In addition, reference power consumed when the smart electric device is operated during a target operation time on the basis of power per predetermined time corresponding to the reference operation value is calculated. The calculated reference power is compared with power consumption of the electric device that operates at a target operation value, so that a consulting message for the excess power is generated.

For example, in the case of the washing machine or dishwasher, water temperature may be used as the principal reason behind power consumption.

If the water temperature is established by the user, the washing machine acting as the smart electric device compares the established target operation value with a reference operation value. If the target operation value exceeds the reference operation value, power consumption corresponding to the excess value is displayed as a consulting message.

In addition, power consumption during a predetermined time for each prestored target operation value is compared with power per predetermined time corresponding to the reference operation value, so that power consumption corresponding to the excess value can be recognized.

In addition, if a water temperature of the washing machine is set to 40° C. or higher, information regarding unnecessary power consumption may be displayed as a consulting message. In addition, appropriate water temperature of the washing machine may be set to 40° C. If the water temperature of the washing machine exceeds 40° C., a consulting message indicating that the similar or same washing effect can be achieved at a lower water temperature is displayed.

If the user selects a water temperature of the dishwasher acting as the smart electric device, the selected target operation value is compared with a reference operation value. If the target operation value exceeds the reference operation value, power consumption corresponding to the excess value is displayed as a consulting message.

In addition, if the user selects a predetermined water temperature or higher for the dishwasher, the dishwasher displays a recommended temperature as a consulting message.

In the case of the refrigerator, power consumption is changed according to a target chamber temperature selected by the user. In the case of the air-conditioner, power consumption is changed according to a target indoor temperature selected by the user.

Therefore, if the user selects a target chamber temperature of the refrigerator acting as the smart electric device, the selected target chamber temperature (i.e., a target operation value) is compared with the reference chamber temperature (i.e., a reference operation value). If the target chamber temperature is less than a reference chamber temperature, power consumption corresponding to a difference between the target chamber temperature and the reference chamber temperature is displayed as a consulting message. In this case, power consumption is displayed in consideration of indoor temperature.

In addition, if the target indoor temperature of the air-conditioner acting as the smart electric device is selected by the user, the selected indoor target temperature (i.e., a target operation value) is compared with a reference indoor temperature (i.e., a reference operation value). If the target indoor temperature is less than the reference indoor temperature, power consumption corresponding to a temperature difference is displayed as a consulting message. In this case, power consumption is changed according to a difference between an indoor set temperature and outdoor temperature, so that the air-conditioner displays power consumption in consideration of the changing power consumption.

In addition, the consulting message of the air-conditioner indicates that power of 7.7 kW is consumed every month whenever a set temperature of the air-conditioner is reduced by 1° C. In addition, the consulting message may also indicate the occurrence of unnecessary power consumption when the set temperature of the air-conditioner is determined to be less than the outdoor temperature by 5° C. or higher.

In this case, power consumption is displayed as an operation time of an electric fan, so that the user can more easily recognize the increased power consumption.

In the case of the electric rice cooker, power consumption is increased in response to the warming time.

The smart electric device counts the operation time, compares the counted operation time with a reference time, and generates a consulting message according to the comparison result.

For example, in the case of the electric rice cooker, if the user selects the warming function, the warming function is counted, and the countered warming time is compared with the reference warming time. If the counted warming time exceeds the reference warming time, power consumption corresponding to the excess time is displayed as a consulting message. In addition, the consulting message may also display that the electric rice cooker is turned off after the lapse of a predetermined time.

The electric rice cooker acting as the smart electric device detects the amount of remaining food. If the detected food amount is equal to or less than a reference food amount, the consulting message indicates the presence of a small amount of food and invites the user to store the small amount of food in a refrigerated state.

In the case of a TV, volume, brightness, and the number of channel setting times may be considered to be the principal reasons of power consumption.

Therefore, the TV detects the volume level, and compares the detected volume level (i.e., a target operation value) with a reference volume level (i.e., a reference operation value). If the counted volume level exceeds the reference volume level, power consumption corresponding to the excess volume is displayed as a consulting message. In this case, the recommended volume may also be displayed as a consulting message.

The TV detects screen brightness and compares the detected screen brightness with the reference brightness. If the detected screen brightness exceeds the reference brightness, the TV may display power consumption corresponding to the excess brightness using a consulting message. In this case, the recommended screen brightness may also be displayed as a consulting message.

The smart electric device 400 compares the number of actual operations corresponding to the number of power on/off operation times received from the second input unit 440 with a reference number of operations, and then generates a consulting message according to the comparison result.

For example, in the case of the washing machine or dishwasher, actual operation times may be considered to be the principal reason behind power consumption. In this case, the consulting message may be generated on the basis of the actual operation times of a small amount of laundry or dishes.

In other words, the washing machine counts the number of washing times of a small amount of laundry during a predetermined time, and the dishwasher counts the number of dishing times of a small number of dishes during a predetermined time.

Under the condition that a small amount of laundry or dishes are contained in the washing machine or the dishwasher, the washing machine or the dishwasher counts the number of operation times during a predetermined time, and compares the counted number of operation times with a reference number of operation times. In this case, if the counted number of operation times exceeds the reference number of operation times, a consulting message indicating the excess operation times is displayed.

For example, in the case of the washing machine, the consulting message "Please be informed that the number of washing operation times of a small amount of laundry exceeds a reference number of times. Please collect a small amount of laundry to be washed and simultaneously wash a large amount of laundry instead of the small amount of laundry" is displayed. As a result, the consulting message invites the user of the washing machine to collect a small amount of laundry and then simultaneously wash a large amount of laundry.

In this case, the number of washing times of the washing machine or dishwasher is compared with the monthly average number of washing times or the number of washing times of a previous month. If the number of washing times of the washing machine or dishwasher is greater than the monthly average number of washing times or the number of washing times of a previous month, information regarding unnecessary power consumption may also be displayed.

Regardless of the small amount or large amount of laundry or dishes, a total number of operation times generated during a predetermined time is compared with a reference number of operation times. If the total number of operation times exceeds the reference number of operation times, a consulting message indicating the excess operation times may also be displayed as necessary.

For example, in the case of a television, the number of power on/off operation times may be considered to be the principal reason of power consumption.

The number of operation times corresponding to the number of power on/off operation times during a predetermined time is counted. The counted number of operation times is compared with the reference number of operation times. If the counted number of operation times exceeds the reference number of operation times, a consulting message indicating the excess operation times may be displayed.

If the smart electric device is a TV, a consulting message may display information regarding power consumption corresponding to the excess operation times. In this case, a reference number of operation times and power consumption per operation may be pre-stored.

The smart electric device 400 compares the number of target operation value change times with a reference number of change times, so that a consulting message regarding a predetermined number of change times is generated.

In the case of the TV, the number of channel change times may be considered to be the principal reason of power consumption.

That is, the TV counts the number of channel changes during a predetermined time, and compares the counted number with a reference number of channel changes. If the counted number of channel changes exceeds a reference number of change times, the excess number of channel changes and its associated power consumption are displayed as a consulting message.

The smart electric device 400 generates a consulting message for artificial information affecting power consumption.

For example, artificial information for use in the refrigerator may include the number of door opening/closing times, storage amount information, storage temperature information, etc. Therefore, the second storage unit of the refrigerator may pre-store information regarding a reference number of door opening/closing times, information regarding power consumption for each door opening/closing operation, reference storage amount information of food stored in the refrigerator, reference storage temperature information of food, power consumption information corresponding to the excess storage amount, and power consumption information corresponding to the excess storage temperature.

If a door opening/closing detection signal is transmitted, the refrigerator counts the number of the transmitted door opening/closing detection signals, compares the counted number with a reference number, and generates power consumption information corresponding to the excess number of times as a consulting message. If a storage amount detection signal is transmitted, the refrigerator determines whether the detected storage amount exceeds a reference storage amount, and generates power consumption information corresponding to the excess storage amount as a consulting message.

For example, the consulting message for the refrigerator may be "Please be informed that a total number of door opening/closing times this month is 60, which is higher than a reference number by 8 so that power of 1.5 kW was additionally consumed this month as compared to reference power".

In addition, upon receiving chamber temperature variation information from the detection unit 480, the refrigerator predicts a temperature of stored food on the basis of the received chamber temperature variation, and compares the predicted food temperature with a reference storage temperature. If the predicted food temperature is greater than a reference storage temperature, power consumption information corresponding to the excess storage temperature may be displayed as a consulting message.

The refrigerator may also display the basic consulting message. That is, the basic consulting message may include "The monthly 0.75 kW power is consumed per four door opening/closing times, the monthly 0.51 kW power is consumed per 10 seconds, the most appropriate amount of stored food is 60%, the monthly 1.8 kW power is consumed whenever the food amount is increased by 10%, and a reference storage temperature of food stored in the refrigerator is 4~15° C."

In addition, power consumption (additionally consumed by the user habit) corresponding to operation condition setup information or power consumption corresponding to the artificial information may be displayed as an icon. Therefore, the user can more easily recognize the excess power.

The smart electric device 400 compares actual consumable use time indicating consumable information needed for operation with a reference use time of a consumable. If the actual use time of the consumable exceeds the reference use time, the smart electric device 400 may display a consulting message including consumable replacement/cleaning period information and power consumption information corresponding to the elapsed time.

In the case of a refrigerator, a kimchi refrigerator or an air-conditioner, the consumable may be a refrigerant or filter. A consulting message for consumables may include refrigerant replacement time information, refrigerant amount information, filter cleaning time information, filter replacement time information, etc.

In addition, the smart electric device 400 may directly detect a consumable state using the detection unit. If the detected state information exceeds reference state information, the smart electric device 400 may also display a consulting message on the basis of power consumption information for each prestored excess state so that the consulting message may indicate information of excess power consumption and consumable replacement information as necessary.

For example, if the consumable is a filter, a filter state may be detected using the detection unit. If the consumable is refrigerant, a refrigerant state may be detected using a refrigerant-amount detection unit.

The smart electric device 400 compares a power consumption pattern stored in the second storage unit 410 with a reference power consumption pattern. The smart electric device 400 determines how many times total power consumption approaches reference power consumption during a predetermined time, compares the determined number of times with a predetermined reference number of times, calculates a predetermined ratio indicating the comparison result, and displays the calculated ratio.

In this case, if the calculated ratio for each electric device exceeds a reference ratio, the corresponding ratio is displayed as a red bar graph (oblique-lined part). Otherwise, if the calculated ratio is less than the reference ratio, the corresponding ratio is displayed as a black bar graph.

In addition, the smart electric device 400 provides a user with a variety of consulting messages, informs the user of a current power consumption situation, and enables the user to recognize the problem of a power consumption pattern. As a result, the smart electric device 400 causes the user to have a good habit when using the electric device, so that the user may have a good or satisfactory habit of using power. As a result, the user can naturally reduce power consumption for each electric device.

The smart electric device 400 generates a consulting message for standby power stored in the second storage unit 410, and displays standby power generated during a predetermined time.

In this way, the smart electric device 400 generates a consulting message for standby power, informs the user of unnecessary power consumption caused by standby power, and enables the user to block the standby power.

The smart electric device 400 is controlled on the basis of power rates and power consumption additionally generated by user habit. Consulting operation information is transmitted to the first communication unit 310 of the power management unit 300 through the second communication unit 430.

The smart electric device 400 may also transmit operation condition setup information whenever an operation condition is manipulated by the user.

As described above, power consumption factors of each smart electric device are displayed as a consulting message, so that the user may recognize a user habit of using the smart electric device and associated power consumption habit and may have a satisfactory or preferable power consumption habit, resulting in reduction of power consumption.

Figure 10:
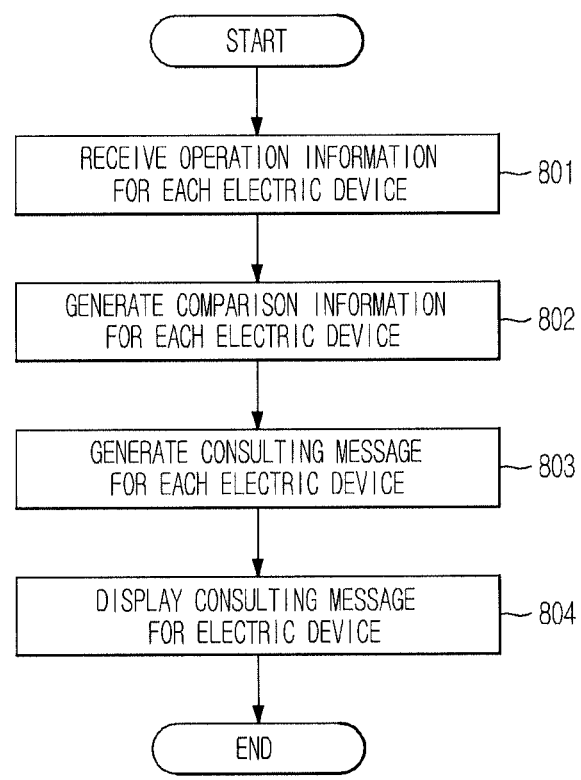
FIG. 10 is a flowchart illustrating a method for controlling the power management system according to an embodiment of the present disclosure.

FIG. 10 is a flowchart illustrating a power management unit according to one embodiment of the present disclosure.

Referring to FIG. 10, in operation 801, the power management unit 300 receives a variety of operation information from several electric devices 400, for example, an operation command affecting electric device operation, artificial information, environmental information, consumable use information, etc. and stores the received information.

The power management unit 300 periodically receives total power consumption and standby power, and stores the received information.

In addition, the power management unit 300 receives power consumption of the general electric device 500 through the smart socket 600, and stores the received information.

In operation 802, if a current time reaches a consulting message provision time, the power management unit 300 classifies a variety of operation information stored in the first storage unit 330 according to individual electric device types, and compares operation information for each electric device with reference information so as to generate comparison information. The power management unit 300 generates a consulting message using the comparison information for electric device in operation 803, and displays a consulting message for each electric device in operation 804.

Whenever a target operation value, environmental information or artificial information from among the operation information is changed, the power management unit 300 may receive the changed information, and may display a consulting message for the received information.

In addition, generation of the consulting message may be identical to the control method of the smart electric device (See FIG. 9).

In addition, the power management unit 300 determines standby power from among power consumption of the general electric device 500 received through the smart socket 600, and generates a consulting message for the determined standby power.

The power management unit 300 displays a consulting message on the first display unit 350. In this case, the consulting message may also be displayed as an icon. In addition, the consulting message may also be output as a sound signal.

In more detail, the power management unit 300 generates a button of a sub-list for providing a consulting message when a consulting message provision button (not shown) of the first input unit 340 is pressed.

If the power consumption habit viewing button B1 is selected through the first input unit 340, the power management unit 300 displays a power consumption habit of all the electric devices.

If the consulting message viewing button B2 for each electric device is selected through the first input unit 340, the power management unit 300 generates the list of several electric devices. If at least one electric device is selected by the user, a consulting message for the selected electric device is displayed.

In this case, if power consumption is displayed as quantitative numerical values, the user may have difficulty in correctly recognizing the degree of power. Therefore, in order for the user to more easily recognize power consumption, a user-friendly icon such as a bulb-shaped or fan-shaped icon is used to display the power consumption.

Therefore, a user-friendly icon such as a bulb-shaped or fan-shaped icon is used to display power consumption, so that the user can more easily recognize the power consumption.

If the standby power viewing menu B3 of all electric devices is selected through the first input unit 340, the power management unit 300 displays standby power of all the electric devices 400 and 500.

In this case, standby power of the smart electric device 400 and standby power of the general electric device 500 may be separately displayed on the first display 350.

In this way, standby powers of the electric devices 400 and 500 are displayed so that a consulting message that invites the user to pull a power plug of high-standby-power electric device out of an AC power source is displayed. Therefore, a good or satisfactory user habit of using the electric device may be achieved to reduce standby power.

In addition, the power management unit 300 may also reduce standby power of the highest-standby-power electric device from among several smart electric devices 400.

In this case, the standby power reduction control provides power only to the communication unit in such a manner that communication of the power management unit 300 is maintained and power of the remaining constituent elements is blocked.

The smart socket further includes a blocking unit such as a switch. The power management unit confirms a high-standby-power general electric device, and drives the blocking unit of the smart socket coupled to the confirmed general electric device, so that generation of the standby power may be blocked as necessary.

The power management unit can intuitively advise the user to recognize his or her habit of using the electric device, so that it invites the user to cure a bad habit of using the electric device, resulting in reduction of power consumption.

In addition, the power management unit provides the user with a power consumption pattern on the basis of operation information and environmental information for each electric device, so that the user can recognize the changing power consumption information in response to operation manipulation for each electric device. As a result, the power management unit can invite the user to actively cure his or her habit of using the electric device, so that the user may have a desirable or good habit of using the electric device in terms of power consumption.

As is apparent from the above description, the embodiments of the present disclosure intuitively inform a user of his or her habit of using the electric device, and help a user to cure a bad habit of using the electric device, so that the user can cure his or her habit of using the electric device, resulting in reduction in power consumption.

The embodiments of the present disclosure inform a user of a power consumption pattern on the basis of operation- and environmental-information for each electric device, so that the user can recognize power consumption information changing according to an operation signal for each electric device.

As a result, the embodiments of the present disclosure can acquire a good power consumption habit variation by a user's active intervention.

The power management unit predicts power to be additionally consumed using information of a habit of a user who uses an electric device, and controls the operations of the electric device according to the predicted result so as to reduce overall power consumption, and prevents power consumption from excess allowed power consumption.

The embodiment of the present disclosure can measure standby power of a general electric device using a smart socket, and provide the measured standby power to the user, resulting in reduction in standby power.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. An electric device comprising:
   an artificial information detection unit to detect artificial information regarding user behavior affecting power consumption of the electric device;
   an input unit to receive an operation command of the electric device from a user, the operation command including a target operation value;
   a storage unit to store operation information for each period, the operation information including the operation command of the electric device and the artificial information;
   a controller configured to:
      count a number of change times of the target operation value;
      generate a power consumption pattern, including an operation pattern generated on the basis of the target operation value and the counted number, on the basis of the operation information for each period;
      generate comparison information by comparing the target operation value with a reference operation value; and
      generate a consulting message on the basis of the power consumption pattern, the comparison information, and the counted number, the consulting message showing the effect of the operation information on the power consumption pattern of the electric device; and
   a display to display the consulting message.

2. The electric device according to claim 1, wherein the operation information further includes at least one of, power consumption for each period, environmental information, and consumable use information.

3. The electric device according to claim 2, further comprising:
   a power measurement unit to measure power for each period; and
   an environmental information detection unit to detect environmental information, wherein the controller generates the operation pattern on the basis of at least one of the environmental information, artificial information, and operation command, and generates the power consumption pattern on the basis of the operation pattern and the power for each period.

4. The electric device according to claim 3, wherein the operation command further comprises a power on/off signal.

5. The electric device according to claim 3, wherein the controller determines standby power generated in a standby mode, and indicates the determined standby power in the consulting message.

6. The electric device according to claim 3, wherein:
   the environmental information detection unit includes at least one of an outdoor temperature detection unit to detect an outdoor temperature and an outdoor humidity detection unit to detect outdoor humidity, and
   the controller determines power consumption variation on the basis of at least one of the outdoor temperature and the outdoor humidity, and generates a consulting message on the basis of the determined result.

7. The electric device according to claim 3, wherein:
   the artificial information detection unit includes at least one of a door opening/closing detection unit to detect door opening/closing, a storage amount detection unit to detect a storage amount of stored food, and a temperature detection unit to detect a storage temperature of stored food on the basis of a chamber temperature variation, and
   the controller generates a consulting message regarding at least one of the number of door opening/closing times, the storage amount, and the storage temperature.

8. The electric device according to claim 3, wherein:
   the artificial information detection unit includes a storage amount detection unit to detect a storage amount of stored objects, and
   the controller compares the storage amount with a reference amount, counts the number of operation times when the storage amount is less than the reference amount, and generates the consulting message regarding the counted number of operation times when the storage amount is less than the reference amount.

9. The electric device according to claim 2, wherein the controller generates the consulting message for each consumable on the basis of the consumable use information.

10. The electric device according to claim 1, wherein the controller determines power consumption generated when the electric device is driven at the target operation value, compares the determined power consumption with reference power, and generates the consulting message on the basis of the result of comparison.

11. The electric device according to claim 10, wherein:
the controller compares the measured power consumption with reference power, and determines the amount of excess power when the measured power consumption exceeds the reference power; and
the display displays the calculated excess power using a user-recognizable icon.

12. The electric device according to claim 10, wherein:
the storage unit further includes a reference operation value corresponding to the reference power, and
the controller generates a recommended value in the consulting message using the reference operation value and the reference power.

13. The electric device according to claim 1, wherein:
the storage unit further stores the consulting message corresponding to the target operation value,
the controller searches for the consulting message corresponding to the target operation value in the storage unit, and controls display of the searched consulting message.

14. The electric device according to claim 1, wherein the controller counts the number of target operation value change times, compares the counted number with a reference number, and generates the consulting message on the basis of the result of comparison.

15. The electric device according to claim 1, wherein the controller counts the number of operation times corresponding to the power on/off signal for a predetermined time, compares the counted number with a reference number, and generates a consulting message on the basis of the result of comparison.

16. A power management device comprising:
a communication unit to receive operation information for each period from several electric devices, the operational information including an operation command of each electric device and artificial information of user behavior, and each operation command comprises a target operation value;
a controller configured to:
  receive the target operation values from among the operation commands of each electric device from the user;
  count a number of change times of the target operation value for each electric device;
  generate a power consumption pattern, including an operation pattern on the basis of the target operation value and the counted number of each electric device, on the basis of the operation information for each period;
  generate comparison information by comparing the target operation value with a reference operation value of each electric device;
  generate a consulting message for each electric device on the basis of the power consumption pattern, the comparison information, and the counted number of each electric device, the consulting message showing the effect of the operation information on the power consumption pattern of each electric device.

17. The power management device according to claim 16, wherein the operation information further includes at least one of power consumption for each period, environmental information, and consumable use information.

18. The power management device according to claim 17, wherein the controller generates the operation pattern on the basis of at least one of the environmental information, the artificial information, and the operation command, and generates the power consumption pattern on the basis of the operation pattern and the power for each period.

19. The power management device according to claim 18, wherein the operation command further comprises a power on/off signal.

20. The power management device according to claim 17, wherein the controller confirms a use period of a consumable mounted to each electric device, compares the confirmed consumable use period with a reference use period of the consumable, and generates the consulting message for the consumable on the basis of the result of comparison.

21. The power management device according to claim 16, wherein the controller determines power consumption generated when the electric device is driven at the target operation value, compares the determined power consumption with reference power, and generates the consulting message on the basis of the result of comparison.

22. The power management device according to claim 16, wherein:
the controller compares the measured power consumption with reference power consumption, and determines the amount of excess power consumption when the measured power consumption exceeds the reference power consumption; and
the display displays the calculated excess power consumption using a user-recognizable icon.

23. The power management device according to claim 16, wherein the controller determines total power consumption generated in an operation mode for each electric device, generates a consulting message for the determined total power consumption, determines total standby power consumed in a standby mode for each electric device, and generates the consulting message for the determined total standby power.

24. The power management device according to claim 16, wherein:
the communication unit receives power of an electric device incapable of communicating with others through a smart socket, and
the controller determines standby power of the electric device incapable of communicating with others and generates the consulting message for the determined standby power.

25. The power management device according to claim 16, wherein the communication unit periodically receives the operation information from the electric devices.

26. A method of controlling an electric device comprising:
receiving an operation command including a target operation value from a user;
detecting artificial information of the user;
storing operation information for each period, the operation information including the operation command and the artificial information;
count a number of change times of the target operation value;
generating an operation pattern on the basis of the operation command;

generating a power consumption pattern on the basis of the operation pattern for each period;

generating comparison information by comparing the target operation value with a reference operation value;

generating a consulting message on the basis of a power consumption pattern, the comparison information, and the counted number, the consulting message showing the effect of the operation information on the power consumption pattern of the electric device; and displaying the consulting message.

27. The method according to claim 26, wherein the generating of the power consumption pattern includes:
measuring power; and
generating the power consumption pattern on the basis of the operation pattern and the power for each period.

28. The method according to claim 27, wherein the generating of the consulting message includes:
calculating power corresponding to the comparison information; and
generating the consulting message on the basis of the calculated power.

29. The method according to claim 28, wherein the generating of the consulting message includes:
determining whether the target operation value exceeds the reference operation value on the basis of the comparison information; and
indicating, if the target operation value exceeds the reference operation value, power corresponding to the excess value in the consulting message.

30. The method according to claim 29, wherein the displaying of the consulting message includes displaying power corresponding to the excess value as a user-recognizable icon.

31. The method according to claim 28, further comprising:
determining power consumption generated when the electric device is driven at the target operation value;
comparing the determined power consumption with reference power; and
generating the consulting message on the further basis of the result of comparison.

32. The method according to claim 26, wherein the generating of the operation pattern further includes:
detecting environmental information; and
reflecting the environment information.

33. The method according to claim 26, wherein the generating of the consulting message includes:
confirming a use period of each consumable;
comparing the confirmed consumable use period with a prestored reference use period; and
generating the consulting message regarding the consumable use period when the consumable use period exceeds the reference use period.

34. The method according to claim 26, further comprising:
measuring power;
determining total power consumption generated in an operation mode during a predetermined time with total standby power generated in a standby mode; and
generating the consulting message for the total power consumption and for the total standby power.

35. A method of controlling a power management device comprising:
receiving operation information, including an operation command and artificial information of user behavior, for each period from each of several electric devices, each operation command including a target operation value;
counting a number of change times of the target operation value for each electrical device,
generating a power consumption pattern, including an operation pattern generated on the basis of the target operation value and the counted number, on the basis of operation information for each period generating comparison information by comparing the target operation value with a reference operation value;

generating a consulting message on the basis of the power consumption pattern the comparison information, and the counted number, the consulting message showing the effect of the operation information on the power consumption pattern of the electric device; and displaying a consulting message for each electric device.

36. The method according to claim 35, wherein the operation information further includes at least one of power consumption for each period, environmental information, and consumable use information.

37. The method according to claim 36, wherein the generating of the power consumption pattern includes:
generating the operation pattern on the further basis of the environmental information, artificial information, and operation command; and
generating a power consumption pattern on the basis of the operation pattern and the power for each period.

38. The method according to claim 37, wherein the generating of the power consumption pattern includes:
receiving the operation command and a target operation value from each electric device;
determining power consumption generated when the electric device is driven at the target operation value;
comparing the determined power consumption with reference power; and
generating the consulting message on the further basis of the result of comparison.

39. The method according to claim 38, further comprising:
confirming which electric device has a target operation value higher than a reference operation value; and
controlling the confirmed electric device on the basis of power rates received from a power provider.

40. The method according to claim 39, further comprising:
displaying the confirmed electric device in a different way from the remaining electric devices.

41. The method according to claim 39, wherein the reference operation value is any one of a past average value, a value established by the user, and a value of a previous month.

42. The method according to claim 35, further comprising:
determining total power consumption generated in an operation mode of the electric devices;
determining total standby power consumed in a standby mode of the electric devices; and
generating the consulting message for the total power consumption for the total standby power.

43. The method according to claim 42, further comprising:
classifying the total power consumption according to individual periods;
comparing power consumption for each period with reference power consumption, and displaying a power consumption habit of a user in the consulting message.

44. The method according to claim 35, further comprising:
confirming which electric device has a highest standby power; and
performing standby power reduction control of the confirmed electric device.

45. The method according to claim 35, further comprising:
receiving power of an electric device incapable of communicating with others through a smart socket; and
determining standby power of the electric device incapable of communicating with others and generating the consulting message on the further basis of the determined standby power.

* * * * *